US008610351B2

(12) United States Patent
Tanaka et al.

(10) Patent No.: US 8,610,351 B2
(45) Date of Patent: Dec. 17, 2013

(54) SURGE ABSORBER

(75) Inventors: Yoshiyuki Tanaka, Chichibu-gun (JP); Tsuyoshi Ogi, Chichibu-Gun (JP)

(73) Assignee: Mitsubishi Materials Corporation, Tokyo (JP)

( * ) Notice: Subject to any disclaimer, the term of this patent is extended or adjusted under 35 U.S.C. 154(b) by 0 days.

(21) Appl. No.: 13/144,599

(22) PCT Filed: Dec. 28, 2009

(86) PCT No.: PCT/JP2009/007339
§ 371 (c)(1),
(2), (4) Date: Jul. 14, 2011

(87) PCT Pub. No.: WO2010/084561
PCT Pub. Date: Jul. 29, 2010

(65) Prior Publication Data

US 2011/0273088 A1 Nov. 10, 2011

(30) Foreign Application Priority Data

Jan. 24, 2009 (JP) ................................. 2009-013730

(51) Int. Cl.
*H01J 17/26* (2012.01)
*H02H 9/06* (2006.01)

(52) U.S. Cl.
USPC ............ 313/631; 313/632; 361/120; 361/118

(58) Field of Classification Search
USPC ........................... 313/631, 632; 361/120, 118
See application file for complete search history.

(56) References Cited

U.S. PATENT DOCUMENTS 3,564,473 A * 2/1971 Kawiechi ........................ 337/28
2007/0058317 A1* 3/2007 Shato et al. ................... 361/118
2007/0230081 A1* 10/2007 Shato et al. ................... 361/118

FOREIGN PATENT DOCUMENTS

JP H0268877 (A) 3/1990
JP 3-252077 A 11/1991
JP 2005-190841 A 7/2005
JP 2008-152948 A 7/2008
JP 2008-186747 A 8/2008

OTHER PUBLICATIONS

International Search Report dated Feb. 26, 2010, corresponding to PCT/JP2009/007339.
Notice of Refusal in Japanese Patent Application No. 2009-013730.
Notice of Refusal in Japanese Patent Application No. 2009-013730, Apr. 25, 2010.

* cited by examiner

*Primary Examiner* — Joseph L Williams
(74) *Attorney, Agent, or Firm* — Edwards Wildman Palmer LLP; Jeffrey D. Hsi

(57) ABSTRACT

[Problems]
Disclosed is a surge absorber which can absorb a surge having a long wave tail, wherein a stable sparkover voltage is obtained without applying a discharging aid to electrodes.
[Means for Solving the Problems]
The surge absorber is comprised of a pair of terminal electrode members (2) which are opposed to each other; and the insulation tube (3) on which the pair of terminal electrode members (2) are disposed on opposite ends thereof and that has a discharge control gas sealed therein. Bulging electrode elements (4) having an expanded center portion (4*a*) are formed on the inner surfaces of the terminal electrode members (2). The bulging electrode elements (4) contain metal which can emit more electrons than the terminal electrode members (2).

4 Claims, 5 Drawing Sheets

SURGE ABSORBER

CROSS-REFERENCE TO RELATED APPLICATIONS

This application is the national phase under 35 U.S.C. §371 of PCT International Application No.: PCT/JP2009/007339, filed on Dec. 28, 2009, which claims priority of Japanese Application No. 2009-013730, filed on Jan. 24, 2009. The contents of each of these applications are incorporated herein by reference in their entirety.

BACKGROUND OF THE INVENTION

1. Field of the Invention

The present invention relates to a surge absorber that protects various equipment from a surge to be generated by lightning or the like and is used for preventing accident from happening.

2. Description of the Related Art

A surge absorber is connected to a portion at which electronic equipment for communication devices such as telephones, fax machines, modems, and the like is in contact with a communication line, and a portion such as power lines, antennas, CRT drive circuits, and the like that is vulnerable to an electric shock due to abnormal overvoltage (surge voltage) such as lightning surge, static electricity, or the like in order to prevent electronic equipment or a printed circuit board mounted on electronic equipment from being damaged due to a thermal damage or ignitions caused by an abnormal overvoltage.

Conventionally, as a surge absorber having good responsibility, Patent Document 1 proposes a surge absorber that employs a surge absorbing element having a micro gap. The surge absorber is a discharge-type surge absorber in which so-called “micro gap” is formed on the circumferential surface of a ceramic component that is a cylindrical insulating component provided with conductive coating, a surge absorbing element having a pair of cap electrodes on the opposite ends of the ceramic component is housed in a glass tube together with a discharge control gas, and a sealing electrode having lead wires on the opposite ends of the cylindrical glass tube is sealed under a high-temperature heating.

On the other hand, Patent Document 2 proposes a discharge-type surge absorbing element having a carbon trigger line in which a plurality of discharge electrodes consisting of rod-like discharge bases are arranged opposing one another across a discharge gap, and is then sealed in a gastight container together with discharge gas. In the discharge-type surge absorbing element in which a lead terminal connected to the lower end of the electrode base is lead outside the gastight container, a trigger electrode made of carbon lines is provided on the dielectric substrate base surface within the gastight container in a micro-spaced apart relation to each of the discharge electrodes.

PRIOR ART DOCUMENTS

[Patent Documents]

Patent Document 1: Japanese Unexamined Patent Publication No. 2003-282216

Patent Document 2: Japanese Patent No. 2745393

SUMMARY OF THE INVENTION

Problems to be solved by the Invention

The following problems still remain in the conventional techniques described above. In the micro-gap type surge absorber disclosed in Patent Document 1, internal elements may be severely damaged when a current surge having a long wave tail enters. Also, in the carbon trigger line-type surge absorber disclosed in Patent Document 2, a projecting electrode for forming main discharge needs to be provided as well as a discharging aid needs to be applied onto the tip of the projecting electrode so as to stabilize the sparkover voltage, resulting in an increase in a manufacturing cost.

The present invention has been made in view of the aforementioned circumstances, and an object of the present invention is to provide a surge absorber which can absorb a surge having a long wave tail, wherein a stable sparkover voltage is obtained without applying a discharging aid to electrodes.

Means for Solving the Problems

The present invention adopts the following structure in order to solve the aforementioned problems. More specifically, the surge absorber of the present invention includes a pair of terminal electrode members that are opposed to each other; and an insulation tube that is disposed on the opposite ends of the pair of terminal electrode members so as to contain discharge control gas in the inside of the surge absorber, wherein a bulging electrode element having an expanded center portion is formed on the inner surfaces of the pair of terminal electrode members, and the bulging electrode element contains metal which can emit more electrons than the terminal electrode members.

In the surge absorber, bulging electrode elements having an expanded center portion are formed on the inner surfaces of a pair of terminal electrode members. Thus, the surge absorber can be readily produced in a simple configuration. In addition, since the electric field concentrates on the expanded center portion of the bulging electrode elements and thus can readily be discharged therethrough, the surge absorber can absorb a surge having a long wave tail. Also, since the bulging electrode elements contain metal which can emit more electrons than the terminal electrode members, a stable sparkover voltage is obtained without applying a discharging aid to the bulging electrode elements.

Also, the surge absorber of the present invention is characterized in that the bulging electrode elements are made of a brazing material that bonds the terminal electrode member with the insulation tube, and the bulging electrode elements are formed in a bulged state by the surface tension thereof on the inner surfaces of the terminal electrode members when the brazing material has been melted. More specifically, in the surge absorber, since the bulging electrode elements are formed in a bulged state by the surface tension thereof on the inner surfaces of the terminal electrode members when the brazing material for adhesion has been melted, the bulging electrode elements having an expanded center portion can be readily formed in synchronous with the adhesion of the terminal electrode members to the insulation tube.

Furthermore, the surge absorber of the present invention is characterized in that the bulging electrode elements are formed by an Ag-containing brazing material. More specifically, in the surge absorber, since the bulging electrode elements are formed by an Ag-containing brazing material, a stable sparkover voltage can be readily obtained because Ag contained in the brazing material has a high electron emission power.

The surge absorber of the present invention is characterized in that a trigger portion made of an electrically conductive material is provided at the inner peripheral surfaces of the insulation tube and at the intermediate portion between a pair of the terminal electrode members. More specifically, in the surge absorber, since a trigger portion made of an electrically conductive material is provided at the inner peripheral surfaces of the insulation tube and at the intermediate portion between a pair of the terminal electrode members, responsibility to the impulse voltage is improved by the trigger discharge via the trigger portion.

In addition, the surge absorber of the present invention is characterized in that the insulation tube is formed by a square-shaped ceramic material. More specifically, in the surge absorber, since the insulation tube is formed by a square-shaped ceramic material, a highly reliable insulation tube can be obtained in comparison with a glass tube or the like and can also be readily surface-mounted because of a chip-like or block-like shape.

According to the present invention, the following effects may be provided.

More specifically, according to the surge absorber of the present invention, bulging electrode elements having an expanded center portion are formed on the inner surfaces of the pair of terminal electrode members, and the bulging electrode elements contain metal which is capable of emitting more electrons than the terminal electrode members. Therefore, the surge absorber can be readily produced in a simple configuration as well as can absorb a surge having a long wave tail, whereby a stable sparkover voltage may be obtained.

BEST MODES FOR CARRYING OUT THE INVENTION

Figure 1:
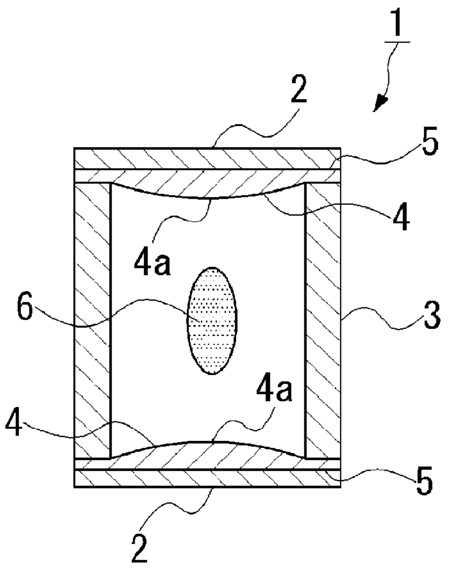
FIG. 1 is a cross sectional view illustrating a surge absorber according to one embodiment of the present invention.

Hereinafter, a surge absorber according to one embodiment of the present invention will be described with reference to FIGS. 1 to 3. In the drawings used in the following description, the scale of each component is changed as appropriate so that each component is recognizable or is readily recognized.

Figure 2:
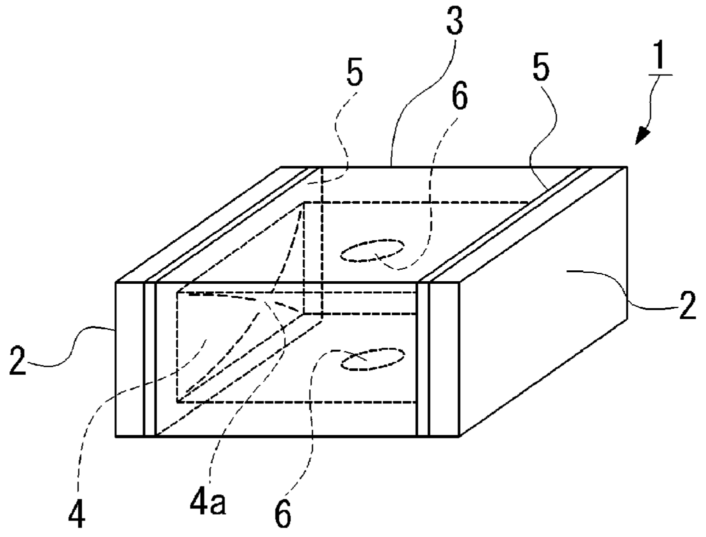
FIG. 2 is a perspective view illustrating the surge absorber according to the present embodiment.
Figure 3:
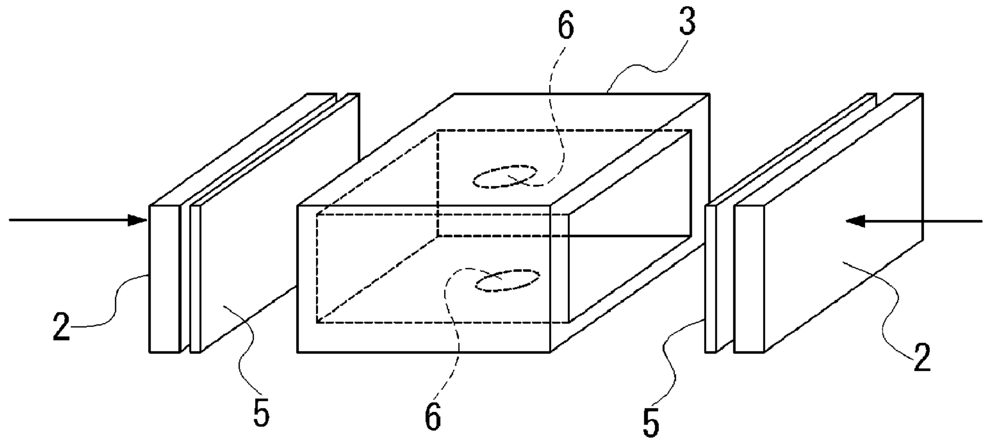
FIG. 3 is an exploded perspective view illustrating a method for producing a surge absorber according to the present embodiment.

As shown in FIGS. 1 to 3, a surge absorber (1) of the present embodiment includes a pair of terminal electrode members (2) that are opposed to each other; and insulation tube (3) on which the pair of terminal electrode members (2) are disposed on opposite ends thereof and that has a discharge control gas sealed therein.

Bulging electrode elements (4) having an expanded center portion (4*a*) are formed on the inner surfaces of the pair of terminal electrode members (2).

The bulging electrode elements (4) are made of a brazing material (5) that bonds the terminal electrode members (2) with the insulation tube (3), and the bulging electrode elements (4) are formed in a bulged state by the surface tension thereof on the inner surfaces of the terminal electrode members (2) when the brazing material (5) has been melted. Furthermore, the bulging electrode element (4) contains metal which can emit more electrons than the terminal electrode members (2). In the present embodiment, the bulging electrode elements (4) are formed by an Ag—Cu brazing material as an Ag-containing brazing material.

The insulation tube (3) is formed by a hollow square-shaped ceramic material having a polygonal profile. Also, a trigger portion (6) made of an electrically conductive material is provided at the inner peripheral surfaces of the insulation tube (3) and at the intermediate portion between the pair of the terminal electrode members (2). For the insulation tube (3), a ceramic material is preferably used, but a glass tube such as a lead glass or the like may also be employed.

The trigger portion (6) is a carbon trigger formed by a carbon material, and may be formed into a linear shape other than an ellipse membrane shape as shown in FIG. 1.

The terminal electrode members (2) are discharge electrodes, and are sealed at the opposite ends of the insulation tube (3) by the brazing material (5).

Examples of the aforementioned discharge control gas includes inert gas such as He, Ar, Ne, Xe, $SF_6$, $CO_2$, $C_3F_8$, $C_2F_6$, $CF_4$, $H_2$, and a mixed gas thereof.

For producing the surge absorber (1), the insulation tube (3) of which the inner surface is formed of the trigger portion (6) is prepared, air within the insulation tube (3) is substituted for a predetermined discharge control gas (e.g., Ar), and then the terminal electrode members (2) are adhered and heated with pressure at the opposite ends of the insulation tube (3) in the state in which the brazing material (5) having a predetermined thickness is arranged on the joining surface and the inner surface of the terminal electrode members (2). In this manner, the brazing material (5) is melted and brought into close contact with the terminal electrode members (2) for sealing, whereby the surge absorber (1) in which discharge control gas is sealed within the insulation tube (3) is obtained.

When the joining is performed, the melted brazing material (5) is pressed against the end of the insulation tube (3) to thereby be pushed into the insulation tube (3), and then the bulging electrode elements (4) is formed into a convex shape with a center portion (4*a*) thereof expanded by a surface tension to thereby be cured. The thickness, material, heating condition, and the like of the brazing material (5) may be determined depending on the inner diameter of the insulation tube (3) or the degree of expansion caused by the surface tension. When the brazing material (5) is expanded by the surface tension, the bulging electrode elements (4) are set up to be formed into a convex shape such as an arc-shaped cross section shape having an expanded center portion (4*a*) instead of a trapezoidal cross-section shape.

The reason of such setup is as follows. If an electrode element has a trapezoidal cross-section with the brazing material (5) simply expanded by the surface tension but does not have an expanded center portion, an electric-field does not concentrate thereon because the center portion is a flat surface, whereby a desired discharge feature cannot be obtained.

As described above, although the brazing material (5) may be installed separately from the terminal electrode members (2), the brazing material (5) may be joined to the joining surface of the terminal electrode members (2) in advance so as to have a two-layer structure and then subjected to melting and joining.

In the surge absorber (1), when the over-voltage or the over-current enters, the trigger discharge is firstly performed between the bulging electrode elements (4) and the trigger portion (6), and then the discharge is further developed between a pair of the bulging electrode elements (4) and thus the surge is absorbed.

In this way, in the surge absorber (1) of the present embodiment, the bulging electrode elements (4) having an expanded center portion (4*a*) are formed on the inner surfaces of a pair of terminal electrode members (2). Thus, the surge absorber (1) can be readily produced in a simple configuration. In addition, since the electric field concentrates on the expanded center portion (4*a*) of the bulging electrode elements (4) and thus can readily be discharged therethrough, the surge absorber can absorb a surge having a long wave tail.

Also, since the bulging electrode elements (4) contain metal which can emit more electrons than the terminal electrode members (2), a stable sparkover voltage is obtained without applying a discharging aid to the bulging electrode elements (4). In particular, since the bulging electrode elements (4) are formed by the Ag-containing brazing material (5), a stable sparkover voltage can be readily obtained because Ag contained in the brazing material (5) has a high electron emission power.

Furthermore, since the bulging electrode elements (4) are formed in a bulged state by the surface tension thereof on the inner surfaces of the terminal electrode members (2) when the brazing material (5) for adhesion has been melted, the bulging electrode elements (4) having an expanded center portion (4*a*) can be readily formed in synchronous with the adhesion of the terminal electrode members (2) to the insulation tube (3).

Since the trigger portion (6) made of an electrically conductive material is provided at the inner peripheral surfaces of the insulation tube (3) and at the intermediate portion between a pair of the terminal electrode members (2), responsibility to the impulse voltage is improved by the trigger discharge via the trigger portion (6).

Since the insulation tube (3) is formed by a square-shaped ceramic material, a highly reliable insulation tube can be obtained in comparison with a glass tube or the like and can also be readily surface-mounted because of a chip-like or block-like shape.

EXAMPLE 1

Next, the surge absorber of the present invention will be specifically described with reference to the evaluation result of the actually produced surge absorber by way of Example, based on the aforementioned embodiment.

For the surge absorber of the present invention according to Example 1, the impulse ratio ("impulse sparkover voltage"/"direct current sparkover voltage") was measured. Note that the closer the impulse ratio is to one, the better the responsibility becomes. The applied impulse was 5 kV with the voltage waveform of 1.2/50. Furthermore, a degradation when the applied surge was 5 kV with 10/700 μs was measured. These evaluation results are shown in the following Table 1.

Figure 4:
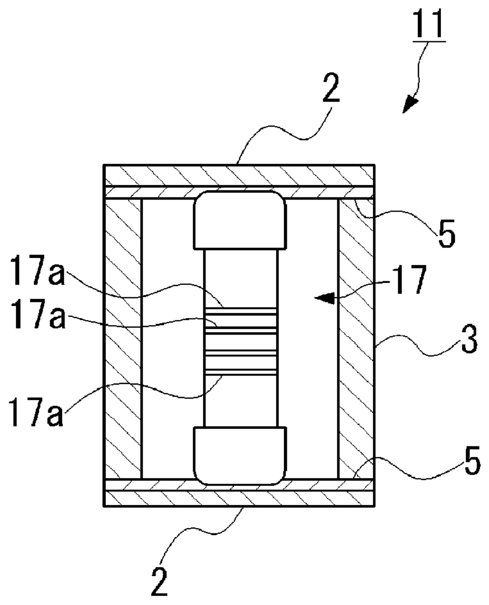
FIG. 4 is a cross sectional view illustrating an example of the conventional surge absorber according to Comparative Example 1 of the present invention.
Figure 5:
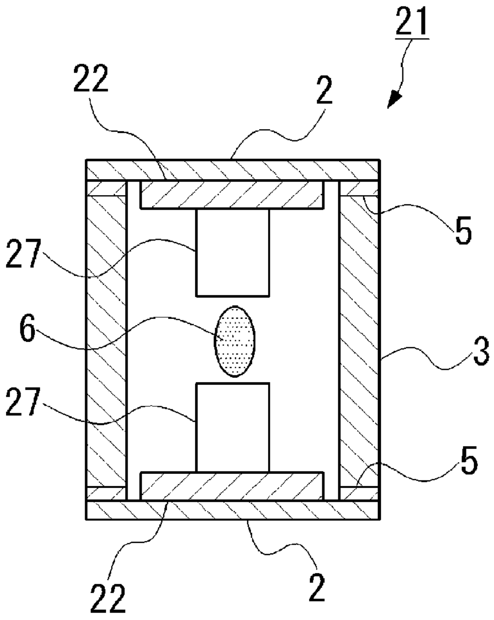
FIG. 5 is a cross sectional view illustrating an example of the conventional surge absorber according to Comparative Example 2 of the present invention.

As Comparative Examples, a conventional micro-gap type surge absorber (11) (Comparative Example 1) in which a cylindrical insulating component (17) on which a plurality of micro gaps (17*a*) is formed is arranged and sealed between a pair of terminal electrode members (2) as shown in FIG. 4, and a conventional arrestor-type surge absorber (21) (Comparative Example 2) which includes a pair of convex electrode members (27) projecting from a pair of terminal electrode members (22) in an opposite manner and in which the trigger portion (6) is formed on the inner surface of the insulation tube (3) as shown in FIG. 5 were produced, and their evaluation results are also shown in Table 1.

In Comparative Example 1, the insulating component (17) serving as an insulator has a diameter of 1 mm, and seven micro gaps (17*a*) of 50/20 μm formed thereon. In FIG. 5, only four micro gaps (17*a*) are shown for simplicity.

TABLE 1

| | Example 1 | Comparative Example 1 | Comparative Example 2 |
|---|---|---|---|
| Manufacturing Conditions | Brazing material; Ag•Cu | Micro gap-type surge absorber Diameter of Insulator 1 mm 50/20 μm × 7 | Arrestor |
| Impulse Ratio | 1.2 | 2.0 | 4 |
| 10/700 Applied 5 kv | No Degradation | Degraded | No Degradation |

As a result of evaluation, the impulse ratio of Example 1 was 1.2, the impulse ratio of Comparative Example 1 was 2.0, and the impulse ratio of Comparative Example 2 was 4. As described above, it is found that Example 1 of the present invention has a smaller impulse ratio (close to 1) than Comparative Examples 1 and 2, and thus has high-speed responsibility.

After surge application, degradation was not found in Example 1 and Comparative Example 2, whereas degradation was found in Comparative Example 1.

As described above, it is found that Example 1 of the present invention exhibits excellent responsibility and has high surge tolerance.

The technical scope of the present invention is not limited to the aforementioned embodiments, but the present invention may be altered in various ways without departing from the scope or teaching of the present invention.

[Reference Numerals]

1, 11, 21: surge absorber, 2: terminal electrode member, 3: insulation tube, 4: bulging electrode element, 4*a*: center portion of bulging electrode element, 5: brazing material, 6: trigger portion

What is claimed is:

1. A surge absorber comprising:

a pair of terminal electrode members that are opposed to each other; and an insulation tube on which the pair of terminal electrode members are disposed on opposite ends thereof and that has a discharge control gas sealed therein, wherein bulging electrode elements having an expanded center portion are formed on the inner surfaces of the pair of terminal electrode members and the bulging electrode elements contain metal which is capable of emitting more electrons than the terminal electrode members; and wherein the bulging electrode elements are made of a brazing material that bonds the terminal electrode member with the insulation tube, and the bulging electrode elements are formed in a bulged state by the surface tension thereof on the inner surfaces of the terminal electrode members when the brazing material has been melted.

2. The surge absorber according to claim 1, wherein the bulging electrode elements are formed by an Ag-containing brazing material.

3. The surge absorber according to claim 1, wherein a trigger portion made of an electrically conductive material is provided at the inner peripheral surfaces of the insulation tube and at the intermediate portion between a pair of the terminal electrode members.

4. The surge absorber according to claim 1, wherein the insulation tube is formed by a square-shaped ceramic material.

* * * * *